US008379053B1

(12) United States Patent
Phillips et al.

(10) Patent No.: US 8,379,053 B1
(45) Date of Patent: Feb. 19, 2013

(54) IDENTIFICATION OF AREAS OF INTEREST ON A WEB PAGE

(75) Inventors: Derek Jason Phillips, Waterloo (CA); Steven Gregory Woods, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/357,329

(22) Filed: Jan. 24, 2012

(51) Int. Cl.
*G09G 5/00* (2006.01)
(52) U.S. Cl. ...................................................... 345/619
(58) Field of Classification Search .................. None
See application file for complete search history.

(56) References Cited

U.S. PATENT DOCUMENTS

| | | | |
|---|---|---|---|
| 6,351,273 B1 * | 2/2002 | Lemelson et al. | 715/786 |
| 6,608,615 B1 * | 8/2003 | Martins | 345/156 |
| 2009/0307215 A1 | 12/2009 | Ball et al. | |
| 2010/0174708 A1 | 7/2010 | Ball et al. | |
| 2011/0074789 A1 * | 3/2011 | Helfman et al. | 345/441 |
| 2011/0082850 A1 | 4/2011 | Ball et al. | |
| 2011/0082897 A1 | 4/2011 | Ball et al. | |
| 2011/0082898 A1 | 4/2011 | Foster et al. | |
| 2011/0276626 A1 | 11/2011 | Ball et al. | |

OTHER PUBLICATIONS

Joseph H Goldberg, Mark J Stimson, Marion Lewenstein, Neil Scott and Anna M. Wichansky, Eye Tracking in Web Search Tasks: Design Implications, 2002, ACM DL Digital Library, ETRA 02 Proceedings of the 2002 Symposium of Eye Tracking Research and Applications, pp. 51-58.*

Hernandez for Eyetools, "Understanding Eye Tracking Part 1: "Misinterpreting Data,"" http://eyetools.com/articles/p1-understanding-eye-tracking-misinterpreting-data, accessed on Mar. 23, 2012, 3 pp.
Hernandez for Eyetools, "Understanding Eye Tracking Part 2: "What you Can Learn From Eyetracking Data,"" http://eyetools.com/articles/p2-understanding-eye-tracking-what-you-can-learn-from-eyetracking-data, accessed on Mar. 23, 2012, 3 pp.
Hernandez for Eyetools, "Understanding Eye Tracking Part 3: "What is a heatmap . . . really?,"" http://eyetools.com/articles/p3-understanding-eye-tracking-what-is-a-heatmap-really, accessed on Mar. 23, 2012, 4 pp.
Hernandez for Eyetools, "Understanding Eye Tracking Part 4: "What is a scan path?,"" http://eyetools.com/articles/p4-understanding-eye-tracking-what-is-a-scan-path, accessed on Mar. 23, 2012, 4 pp.
Hernandez for Eyetools, "Understanding Eye Tracking Part 5: "Time and the Heatmap,"" http://eyetools.com/articles/p5-understanding-eye-tracking-time-and-heatmaps, accessed on Mar. 23, 2012, 4 pp.
Feng-Gui, "Feng-Gui Dashboard," http://www.feng-gui.com/help.htm, accessed on Mar. 23, 2012, 3 pp.

* cited by examiner

*Primary Examiner* — Hau Nguyen
*Assistant Examiner* — Leon T Cain, II
(74) *Attorney, Agent, or Firm* — Shumaker & Sieffert, P.A.

(57) ABSTRACT

Interest mapping systems and/or methods determine areas of interest on a web page or other information resource based on the time a user spends in various scroll positions on the page. The system identifies scroll positions on a web page that are maintained for at least a predetermined period of time. The system may further generate one or more interest maps for web page or other information resource indicative of those areas of the web page which seem to be of relatively more or less interest to users. The system may further generate trend data for the web page based on the scroll position data over time.

18 Claims, 8 Drawing Sheets

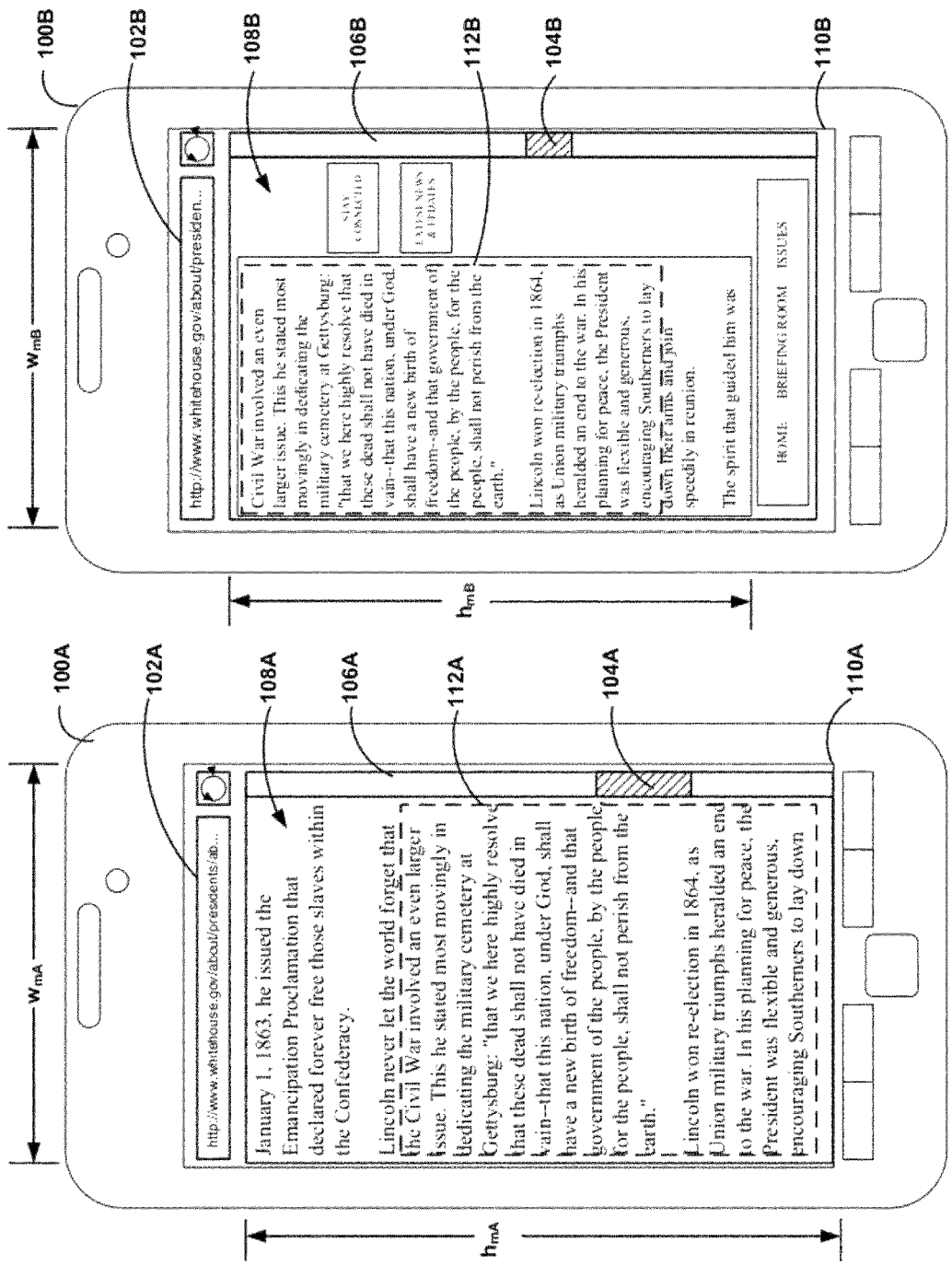

IDENTIFICATION OF AREAS OF INTEREST ON A WEB PAGE

TECHNICAL FIELD

This disclosure relates to determination of areas of interest on a web page or other information resource.

BACKGROUND

Modern computing devices may include a screen for displaying information. In some instances, the computing devices may not be able to display all of the information at once, such as when displaying a web page on a computing device with a relatively small screen, such as a mobile phone.

Designers of digital content may be interested to know what areas of the digital content are of relatively more or less interest to users. For example, web page designers may be interested in tracking what areas of a web page are most frequently viewed by visitors. This may be accomplished, for example, by tracking which sections or areas of a page are selected, cut-and-pasted, or clicked. Other examples include eye tracking studies which may be used to estimate the areas of a web page or other information resource that receive relatively more or less visual attention.

SUMMARY

In general, this disclosure is directed to systems and/or methods for identification of areas of interest on a web page or other information resource.

In one example, the disclosure is directed to a method including receiving, at a processor, scroll position data from at least one computing device, the scroll position data indicative of a plurality of scroll positions on the computing device, identifying, using the processor and based on the scroll position data, one or more scroll positions that are maintained for at least a predetermined period of time on the computing device, identifying, using the processor, one or more of a plurality of areas of a web page associated with each of the identified scroll positions, and assigning, using the processor, a frequency for each of the one or more identified areas of the web page at which the associated scroll position was maintained for at least the predetermined period of time on the computing device. The method may further include generating an interest map based on the assigned frequency for each of the one or more identified areas of the web page. The method may further include generating one or more of a histogram, a heat map, and an interest graph based on the assigned frequency for each of the one or more identified areas of the web page. The method may further include receiving, at the processor, scroll position data from each of a plurality of computing devices, identifying, using the processor and based on the scroll position data, one or more scroll positions that are maintained for at least a predetermined period of time on each of the computing devices, identifying, using the processor, one or more of a plurality of areas of a web page associated with each of the identified scroll positions, and assigning, using the processor, a frequency for each of the one or more identified areas of the web page at which the associated scroll position was maintained for at least the predetermined period of time on the computing devices.

In another example, the disclosure is directed to a tangible computer-readable storage medium encoded with instructions that cause one or more processors of a computing device to perform operations including receive scroll position data from at least one computing device, the scroll position data indicative of a plurality of scroll positions on the computing device, identify, based on the scroll position data, one or more scroll positions that are maintained for at least a predetermined period of time on the computing device, identify one or more of a plurality of areas of a web page associated with each of the identified scroll positions, and assign a frequency for each of the one or more identified areas of the web page at which the associated scroll position was maintained for at least the predetermined period of time on the computing device.

In another example, the disclosure is directed to a system including at least one processor that receives scroll position data associated with each of a plurality of computing devices, the scroll position data indicative a plurality of scroll positions on the associated computing device, a database that stores the scroll position data and an interest mapping application, wherein the processor further identifies, based on the associated scroll position data and using the interest mapping application, one or more scroll positions that are maintained for at least a predetermined period of time, identifies one or more areas of the web page associated with each of the identified scroll positions, and assigns a frequency for each of the plurality of areas of the web page at which the associated scroll position was maintained for at least the predetermined period of time.

The details of one or more examples are set forth in the accompanying drawings and the description below. Other features and advantages of this disclosure will be apparent from the description and drawings, and from the claims.

BRIEF DESCRIPTION OF DRAWINGS

FIG. 3 is a diagram illustrating another example computing device with example information presented on the display.

FIG. 4 is a diagram illustrating another example computing device with example information presented on the display.

DETAILED DESCRIPTION

The systems and/or methods described herein determine areas of interest on a web page or other information resource based on the time a user spends in various scroll positions on the page. Although the examples given herein are described with respect to a web page (that is, a web page displayed on a computing device, such as a mobile phone, laptop computer, table computer, personal digital assistant, etc., it shall be understood that the techniques described herein may be used with respect to any type of displayed information, and that the disclosure is not limited in this respect. In addition, the web page or other displayed information may be static or dynamic, and the disclosure is not limited in this respect.

Typically, once a user has scrolled to a position on a web page at which content of interest is displayed, the user may maintain that scroll position for a period of time during which the user will read, view, or otherwise take-in the information currently displayed on the screen. On the other hand, content which is of no particular interest to a user may be scrolled-through fairly quickly. The systems and/or methods described herein receive scroll-position data from a plurality of user computing devices, such as mobile phones. The system identifies the scroll positions on each web page that were maintained for at least a predetermined period of time. The system may then determine the frequency at which each area on the web page was viewed for at least the predetermined period of time. Typically, once a user has scrolled to a position on a web page or other information resource at which content of interest is displayed, the user will maintain that scroll position for a relatively longer period of time than those scroll positions displaying content of which they are not interested. Content which is of no particular interest to a user may typically be scrolled-through fairly quickly. Thus, time spent at a particular scroll position may be used to identify areas of interest on a web page or other information resource. The system may further generate one or more interest maps based on the areas of overlap to identify areas of interest (such as text, pictures, videos, etc.) on a web page or other information resource which seem to be of relatively more or less interest to users.

Figure 1:
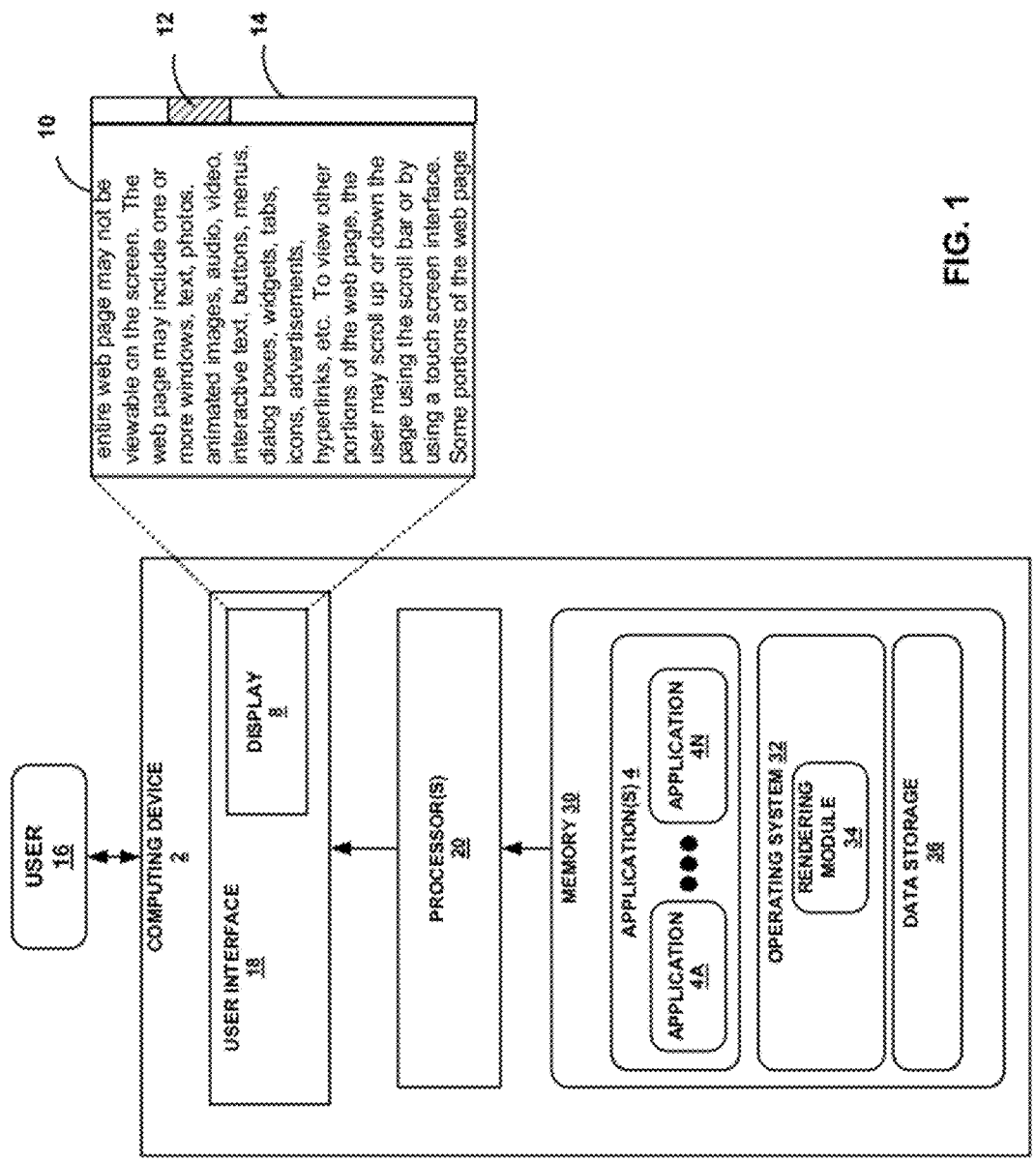
FIG. 1 is a conceptual diagram illustrating an example computing device with example information presented on a display.

FIG. 1 is a conceptual diagram illustrating an example computing device 2. Computing device 2 may include one or more stand-alone devices or may be part of a larger system. In certain examples, computing device 2 may include a mobile device. For instance, computing device 2 may include or be part of a wireless communication device (e.g., wireless mobile handset or device), a video telephone, a digital multimedia player, a personal digital assistant (PDA), a video game console, tablet PC, a laptop computer, or other device. In some examples, computing device 2 may communicate with other devices via one or more networks (not shown), such as one or more wired or wireless networks, including the Internet.

As shown in the example of FIG. 1, computing device 2 may include one or more processors 20, a memory 30, and a user interface 18. User interface 18 may include a display 8. User interface 18 may further include one or more input devices to enable a user to input data, such as a keyboard, mouse, touchpad, track pad, touch screen, touch pad, microphone, camera, etc. Memory 30 may store one or more applications 4A-4N, an operating system 32 including rendering module 34, and data 36. Applications 4A-4N (collectively, "applications 4") and operating system 32 including rendering module 34 may be executed by the one or more processors 20 included within computing device 2. Display 8 may present images to a user 16, such as web page content or other information 10. In some examples, display 8 may be configured as a "touch screen" and may thus be configured to detect and respond to touch-based input from user 16. User 16 may initiate functionality of the device and input content by interacting with the touch screen display 8, a keyboard (not shown) or with various other controls that may be provided by device 2.

Memory 30 may be configured to store information within computing device 2. Memory 24 may, in some examples, be described as a computer-readable storage medium. In some examples, memory 30 may include a temporary memory, meaning that a primary purpose of at least part of memory 30 is not long-term storage. Memory 30 may also include volatile memory, meaning that at least part of memory 30 does not maintain stored contents when the computer is turned off. Examples of volatile memories include random access memories (RAM), dynamic random access memories (DRAM), static random access memories (SRAM), and other forms of volatile memories known in the art. In some examples, memory 30 may be used to store program instructions for execution by processors 20. Memory 30 may be used by software or applications running on computing device 2 (e.g., one or more of applications 4 shown in FIG. 1) to temporarily store information used or generated during program execution. Memory 30 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Each of applications 4 is operable on computing device 2 to perform one or more functions during execution. For example, one or more of applications 4 may include a web application that interacts and/or exchanges data with a device that is external to computing device 2. A web application may, in some instances, be executable within a web browser that is operable on computing device 2. Computing device 2 may, in various instances, download or otherwise obtain one or more of applications 4 from an external server via one or more networks (not shown). For instance, a web browser hosted by computing device 2 may download one or more of applications 4 upon access of one or more web sites hosted by such as external server (e.g., web server).

During execution, any of applications 4 may implement, invoke, execute, or otherwise utilize rendering module 34 and display 8 to render and display information utilized by one or more of applications 4 on display 8. For example, if one of application 4A is a web browser application, the application 4A may invoke rendering module 34 to render a web page for display on display 8, which is viewable by user 16. In another example, if application 4B is an e-reader application, application 4B may invoke rendering module 34 to render pages of an e-book stored within data storage 36 or downloaded from a remote computing device for display on display 8. In another example, if application 4N is a text messaging application, application 4N may invoke rendering module 34 to render text messages for display on display 8.

For example, application 4A may invoke rendering module 34 to render a web page 10 for display on display 8. The web page 10 may include one or more of windows, text, photos, animated images, audio, video, interactive text, buttons, menus, dialog boxes, widgets, tabs, icons, advertisements, hyperlinks, etc. Rendering module 34 may format the information to be displayed on display 8. Rendering module 34 may generate device specific formatting for the information. That is, rendering module 34 may process the information and format the information based upon the physical characteristics of display 8, the display size, the display resolution, and/or based one or more configuration parameters stored within computing device 2.

A web page (or other information resource) may require more screen space than is available for a particular display resolution. For example, only a portion of web page 10 is currently displayed as shown in FIG. 1. A typical web browser may include one or more navigational tools that provide the ability to navigate through continuous text, pictures, or other content on a web page or other displayed information. For example, a web page may include a scroll bar 14 that permits the user to scroll through the content of a web page or other information presented on display 8. To do so, the user may touch the bar or "thumb" 12 and move it up or down within scroll bar 14 in order to view the desired content. Other examples of navigational tools may include page up and down keys, scroll wheels, page menus, tabs, touch pads, touch screens, etc. The displayed content thus varies with the position of the scroll bar or other navigational tool.

Computing device 2 may also include network interface (not shown) to communicate with external devices (e.g., one or more servers, web servers) via one or more networks.

Figure 2:
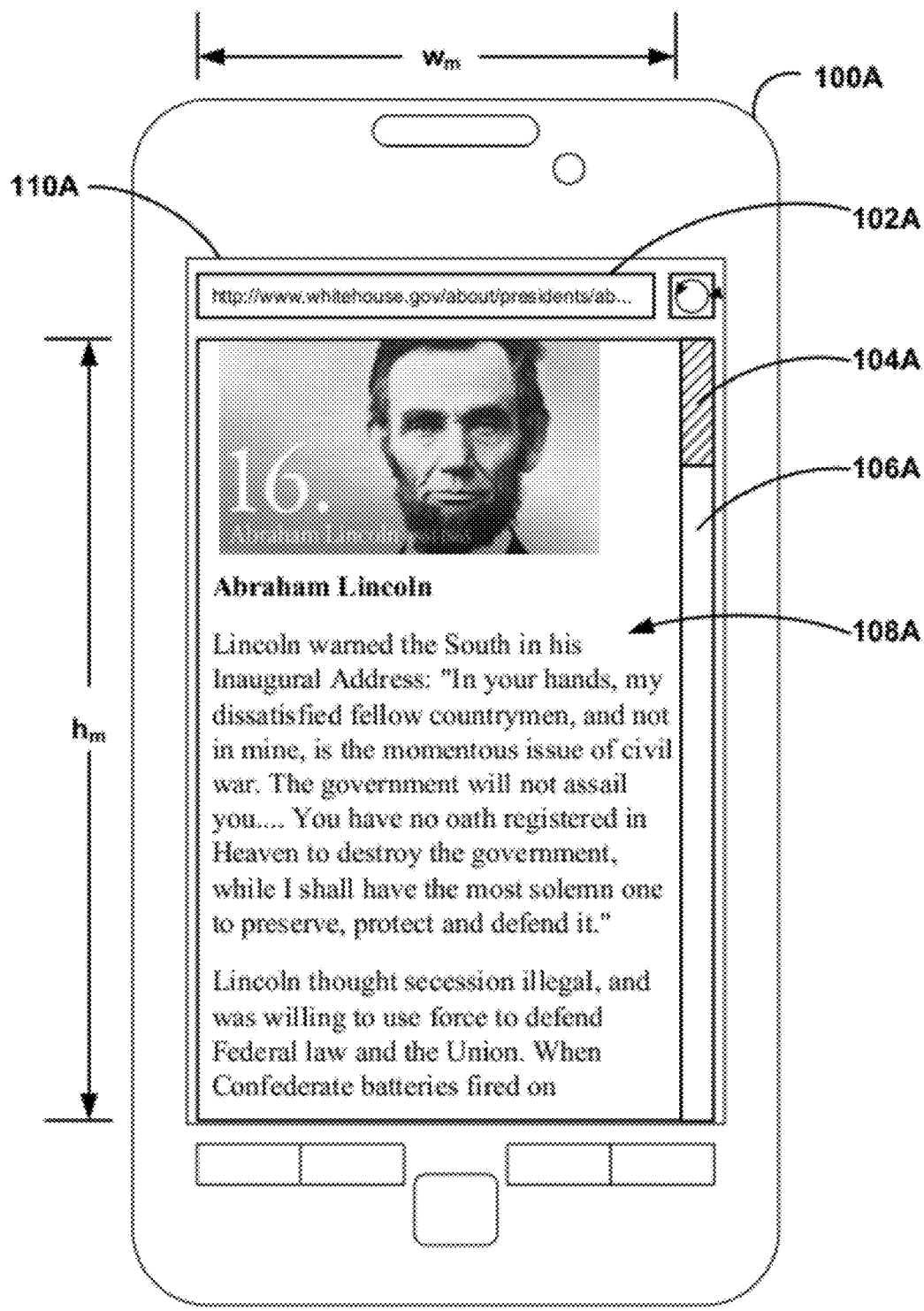
FIG. 2 is a diagram illustrating an example computing device with example information presented on the display.

FIG. 2 is a diagram illustrating an example computing device 100A with example information presented on a display 110A. Display 110A has a height $h_m$ and a width $w_m$. A portion 108A of a web page is currently being presented on display 110A. Display 110A lists the URL 102A of the web page (in this case, a web page concerning President Abraham Lincoln). A scroll bar 106A including a thumb 104A is displayed along the right sides of the displayed web page content 108A. In FIG. 2, the position of thumb 104A within scrollbar 106A (the so-called "scroll position") indicates that the topmost portion of the web page is currently being displayed. The web page may also be thought of as also having a height and a width, $h_p$ and $w_p$, respectively, although these are not shown on FIG. 1 because in this example, the entire web page is too large to be visible on display 110A.

In this example, only a vertical scrollbar 106 is shown. However, it shall be understood that display 110A may also include a horizontal scrollbar, and that the disclosure is not limited in this respect.

FIGS. 3 and 4 are diagrams illustrating "overlapping" areas of interest on a web page viewed by two computing devices, 100A and 100B. In this example, computing devices 110A and 110B have screen heights $h_{mA}$ and $h_{mB}$, and screen widths $w_{mA}$ and $w_{mB}$, respectively. FIG. 3 is a diagram illustrating an example computing device 100A with a different portion of example web page 108A presented on display 110A as compared to the portion of the web page presented on display 110A in FIG. 2. In FIG. 3, thumb 104A has been moved downward to a "lower" scroll position in the scroll bar 106A as compared to the scroll position illustrated in FIG. 2, so that a portion of the web page 108A corresponding to the "lower" scroll position 104A is displayed on the screen of the computing device.

FIG. 4 is a diagram illustrating another example computing device 102B. Computing device 102B includes a display 110B on which the URL 102B of the current web page is displayed. In this example, computing device 102A and 102B are viewing the same web page. However, a different portion 108B of the web page is currently being displayed on computing device 102B. Computing device 110B also displays a scroll bar 106B having a thumb 104B at a scroll position corresponding to the web page content displayed on the screen.

Typically, once a user has scrolled to a position on a web page or other information resource at which content of interest is displayed, the user will maintain that scroll position for a relatively longer period of time than those scroll positions displaying content of which they are not interested. Content which is of no particular interest to a user will typically be scrolled-through fairly quickly. Thus, time spent at a particular scroll position may be used to identify areas of interest on a web page or other information resource. The techniques described herein determine areas of interest on a web page or other information resource based the time a user spends in various scroll positions on the page.

The scroll positions associated with a web page are in turn associated with displayed "rectangles" having dimensions $h_{mA} \times w_{mA}$ and $h_{mB} \times w_{mB}$, for computing devices 100A and 100B, respectively. In one example, by determining the overlap between such rectangles of a plurality of users at which users paused for at least a predetermined period of time, t, the system described herein may identify areas on the page that were viewed by users for at least the predetermined period of time, t. Assuming time t is chosen appropriately, these identified areas may be considered to be the areas of most interest to users at the moment.

In other examples, the shapes need not be "rectangles" but could be any other type of 2-D or 3-D shape depending at least in part upon the display size, shape and type. The web page may be subdivided into discrete areas of any desired size and shape, and the overlap or frequency at which users pause at those discretized areas may be determined. The areas may be uniformly sized and shaped or may be non-uniformly sized and shaped. The system may also employ R-trees or other type of data structure to identify the frequency at which pauses of a predetermined period of time occur for individual areas of the web page.

As mentioned herein, in some examples, the system may identify, for each of one or more areas on a web page or other information resource, the frequency at which a plurality of users paused for at least a predetermined period of time. In other examples, the system need not determine whether a pause occurred for a predetermined period of time. In those examples, the system may poll for scroll position data and/or device configuration data on a regular basis. The average "viewing time" (that is, the amount of time that each area is displayed on a user's computing device) for each location/area on the web page may be summed over a plurality of users to identify the relative amount of interest for one or more areas of the web page.

For purposes of the examples shown in FIGS. 3 and 4, assume that the users associated with devices 100A and 100B are both interested in Lincoln's well-known quote from the Gettysburg address, "government of the people, by the people, for the people." The scroll positions of FIGS. 3 and 4 illustrate that displayed content 108A on computing device 100A and displayed content 108B on computing device 100B "overlap" as indicated by reference numerals 112A and 112B. Similar data obtained from a plurality of mobile computing devices 100 may be used to determine the specific areas on a page that were viewed by users for at least a predetermined period of time, t. In this example, if many users pause at a scroll position at which the above-quoted text is displayed, the overlapping portions of the displayed web content of a plurality of users may indicate that users are particularly interested in the quote "government of the people, by the people, for the people."

Figure 5:
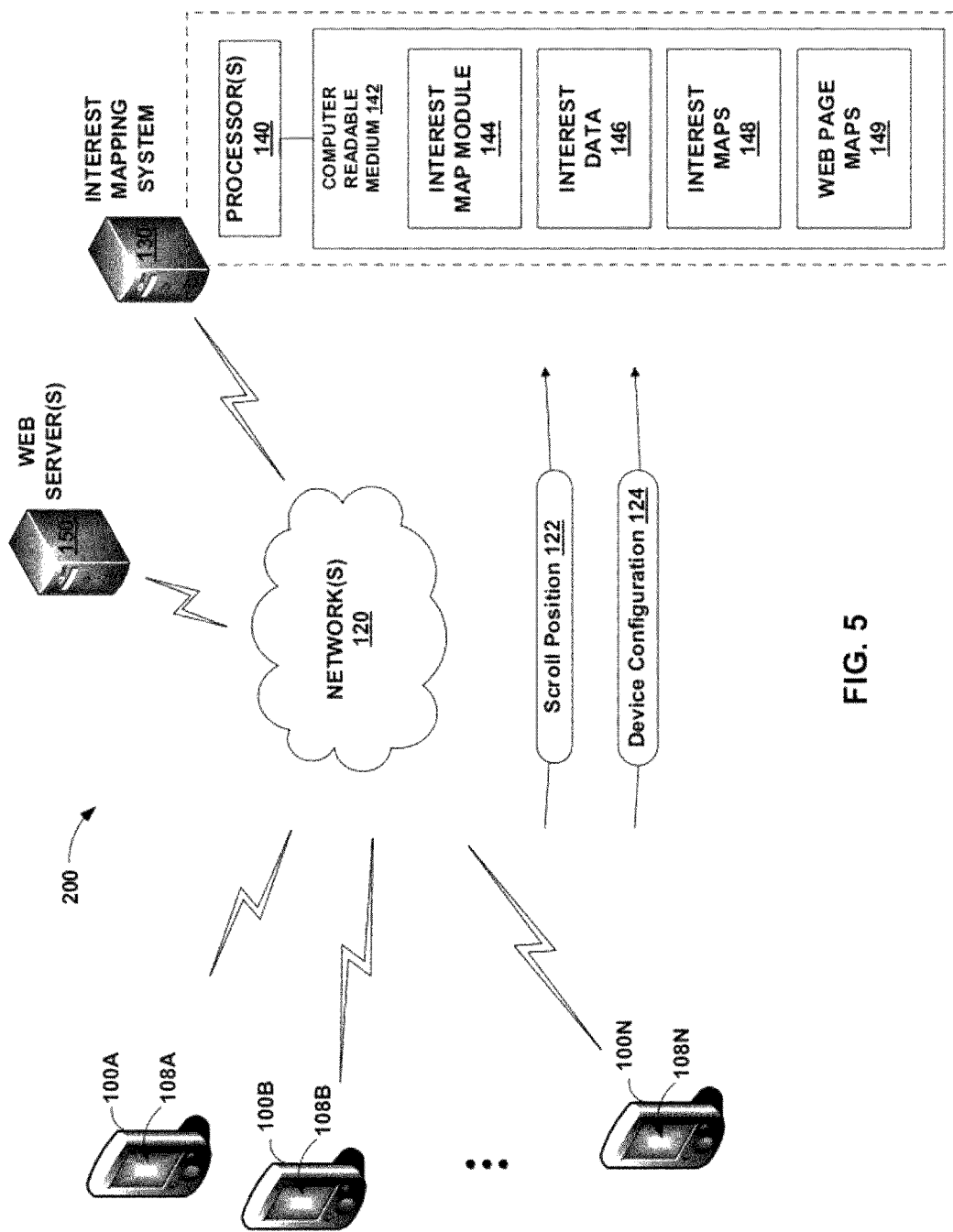
FIG. 5 is diagram illustrating an example computing environment in which the interest mapping system and methods may be used.

FIG. 5 illustrates an example of a computing environment 200 in which the current techniques for determining relative areas of interest on a web page or other information resource may be used. A plurality of computing devices, in this example mobile computing devices 100A-100N, may access web pages or other information resources through a web browser application operating on the computing device. The web pages or portions thereof are displayed on the mobile computing device display 108A-108N, respectively. The web pages or other information resource may be retrieved from a local computer, from one or more remote web servers 150, from another user computing device, or from any other local or remote computer. Web servers 150 include hardware and software through which content may be accessed through one or more networks 120. The networks 120 may include a private network, such as an intranet, a public network, such as the Internet, or some combination thereof. Although in this example computing devices 100A-100N are depicted as mobile phones, computing devices 100A-100N may be, for example, laptop computers, tablet computing devices, digital picture frames, desktop computers, televisions, set top boxes, PDA (Personal Digital Assistant), smart phones, other mobile or stationary computing devices, or any other suitable device or combination of devices.

Computing devices 100A-100N may also communicate with an interest mapping system 130 via the network(s) 120. Interest mapping system may include one or more processors 140 and one or more types of computer memory and computer data storage, represented generally as computer readable medium 142. Computer readable medium may include database storage functions, application storage functions, or other storage functions. To that end, computer readable medium 142 may include, for example, an interest mapping module 144, interest data 146, and one or more interest maps 148. Interest mapping module 144 includes software that, when executed by the one or more processors 140, identifies relative areas of interest on a web page or other information resource. Interest data 146 may include, for example, scroll position data 122, device configuration data 124, or other information received from one or more of the computing devices 100A-100N that may be relevant to the determination of areas of interest on a web page or other information resource. Interest mapping module 144 may also include software that, when executed by the one or more processors 140, generate one or more interest maps 148 based on the interest data 146. For example, one or more interest maps 148 may be generated for each of a plurality of web pages or other information resources. In addition, each interest map 148 may indicate the relative areas of interest on the web page. Interest maps 148 may take the form of, for example, one or more histograms, heat maps, interest graphs, or other numerical or visual representations of the relative areas of interest on a web page or other information resource.

Interest mapping system may also store one or more web page maps 149. Web page map 149 stores a map of each web page as a plurality of distinct areas within the web page. For example, if a web page may be considered as having a width $w_p$ and a height $h_p$, the web page may be divided into an array having $w_p/n$ rows and $w_p/m$ columns, wherein n and m are integers values of which the width and height are to be divided, respectively. This would result in a web page having $(w_p/n) \times (w_p/m)$ areas of equal size. Alternatively, the areas of the web page may be subjectively determined based on the contents of the particular web page. For example, an image may be considered one area or be broken down into multiple areas, a defined amount of text (such as a word, phrase, sentence, and/or paragraph) may be considered an area, a hyperlink may be considered an area, etc.

Interest mapping system 130 may receive scroll position data 122 and device configuration data 124 from one or more of the computing devices 100A-100N. Interest mapping system 130 may analyze the scroll position data 122 and device configuration data 124 to identify, for each computing device 100, one or more scroll positions that are maintained for at least a predetermined period of time.

The users of the one or more computing devices 100A-1100N may pause at the same or at different scroll positions. In addition, the display dimensions of each user computing device 100A-100N may affect the amount of the web page or other information resource that is presented on the corresponding "rectangle" of the respective displays 108A-108N. Interest mapping system may determine the displayed portion of the web page or other information resource based on the scroll position data 122 and the device configuration data 124 received from the computing device.

Scroll position data 122 may include, for example, vertical scroll position data and/or horizontal scroll position data. Device configuration data may include, for example, display screen dimensions (e.g., width and height), display resolution (e.g., dots per inch, and/or other display configuration data for each of the computing devices 100A-100N that may affect the amount of data or information viewable on the screen, and hence the particular information content that is displayed at a particular scroll position on a particular device. Interest mapping system 130 may analyze scroll position data 122 and device configuration data 124 to identify one or more areas of a web page or other information resource which are associated with each scroll position. As mentioned above, interest mapping system 130 may further analyze identified scroll positions and the areas of the web page to generate one or more interest maps 148.

Interest mapping system 130 may receive the scroll position data 122 and/or the device configuration data in one or more different ways. For example, scroll position data 122 and/or device configuration data 124 may be sent only for those scroll positions at which the scroll position is paused for a predetermined period of time. In another example, a user computing device may include one or more scroll timers such that scroll position data 122 and/or device configuration data 124 is sent from the user computing device to interest mapping system 130 at predetermined intervals or times as determined by the scroll timer(s). In these examples, the scroll position data and/or configuration data 124 need not be sent right away. The data may be batched on the user computing device client by storing them in the device database, cookies, or any kind of local storage and sent to interest mapping system 130 at a later time. For example, the scroll position and/or device configuration data may be batched and sent at regular intervals, piggy-backed on top of other requests, etc.

In another example, content may be dynamically fetched and loaded only when a user scrolls to a certain position. This may allow the interest mapping system 130 to track the areas of a web page or other information resource which pieces are loaded and thus to identify the (approximate) view windows.

Although various examples have been described for sending/receiving the scroll position data 122 and/or the device configuration data 124, it shall be understood that these are for example purposes only, and that the disclosure is not limited in this respect.

Figure 6:
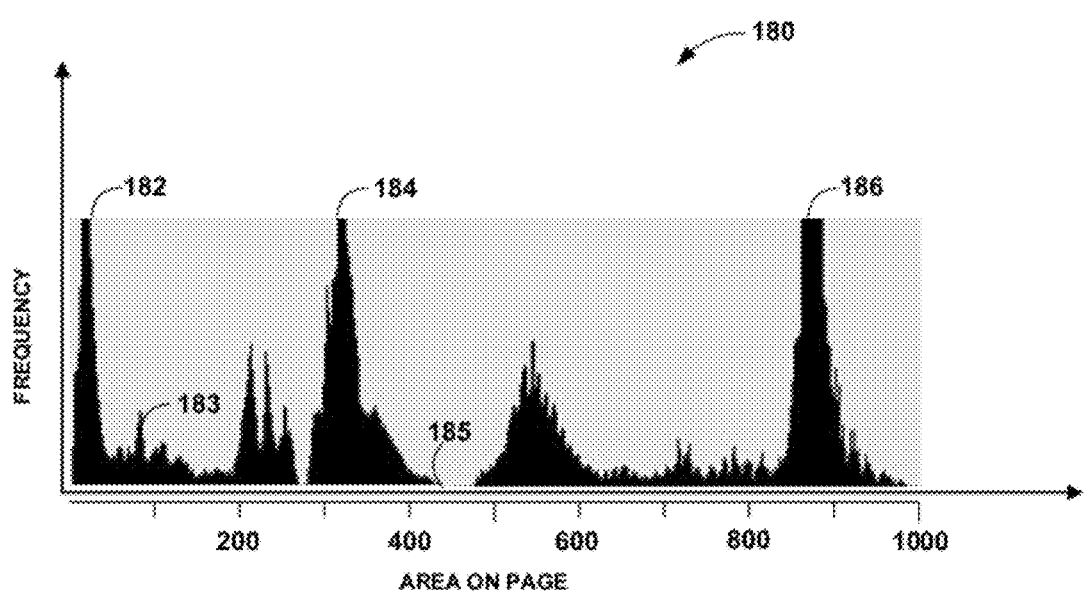
FIG. 6 is an example of a histogram representing interest information, which may be generated by an interest mapping system.

FIG. 6 illustrates an example interest map 180 for a web page or other information resource which may be generated by interest mapping system 130. In this example, interest map 180 is presented as a histogram of the frequency (e.g., the number of times a plurality of computing devices paused at each area on the page for at least a predetermined period of time) versus the area on the page (e.g., a particular area on the web page or other information resource). In this example, the web page is divided into 1000 discrete "bins" corresponding to 1000 discrete areas on the page. However, the web page or other information resource may be divided into any number of appropriate bins or areas. The number of areas on the page may be based on the desired granularity of the interest map, the overall size of the web page or other information resource, or upon other factors that may influence the number of bins for each page.

Interest map 180 indicates the frequency at which a plurality of computing devices paused at a certain area on the page for at least a predetermined period of time. The frequency may be an absolute frequency, a relative frequency, a normalized frequency, etc. Interest maps such as interest map 180 and/or the data used to generate the one or more interest map(s) may be used to determine, for example, the areas on a web page or other information resource that are of relatively more or less interest to users. For example, in the histogram of FIG. 6, the page areas designated by reference numerals 182, 184, and 186 had relatively more users pause at those areas on the page for at least the predetermined period of time than did, for example, areas 183 and 185. In the Abraham Lincoln web page example described above with respect to FIGS. 2-4, reference numeral 182 may correspond to the area of the web page containing the picture of Abraham Lincoln (see, e.g., FIG. 2); reference numeral 184 may correspond to the quote "government of the people, by the people, for the people;" and reference numeral 186 may correspond to the web page content "On Good Friday, Apr. 14, 1865, Lincoln was assassinated at Ford's Theatre in Washington by John Wilkes Booth."

Figure 7:
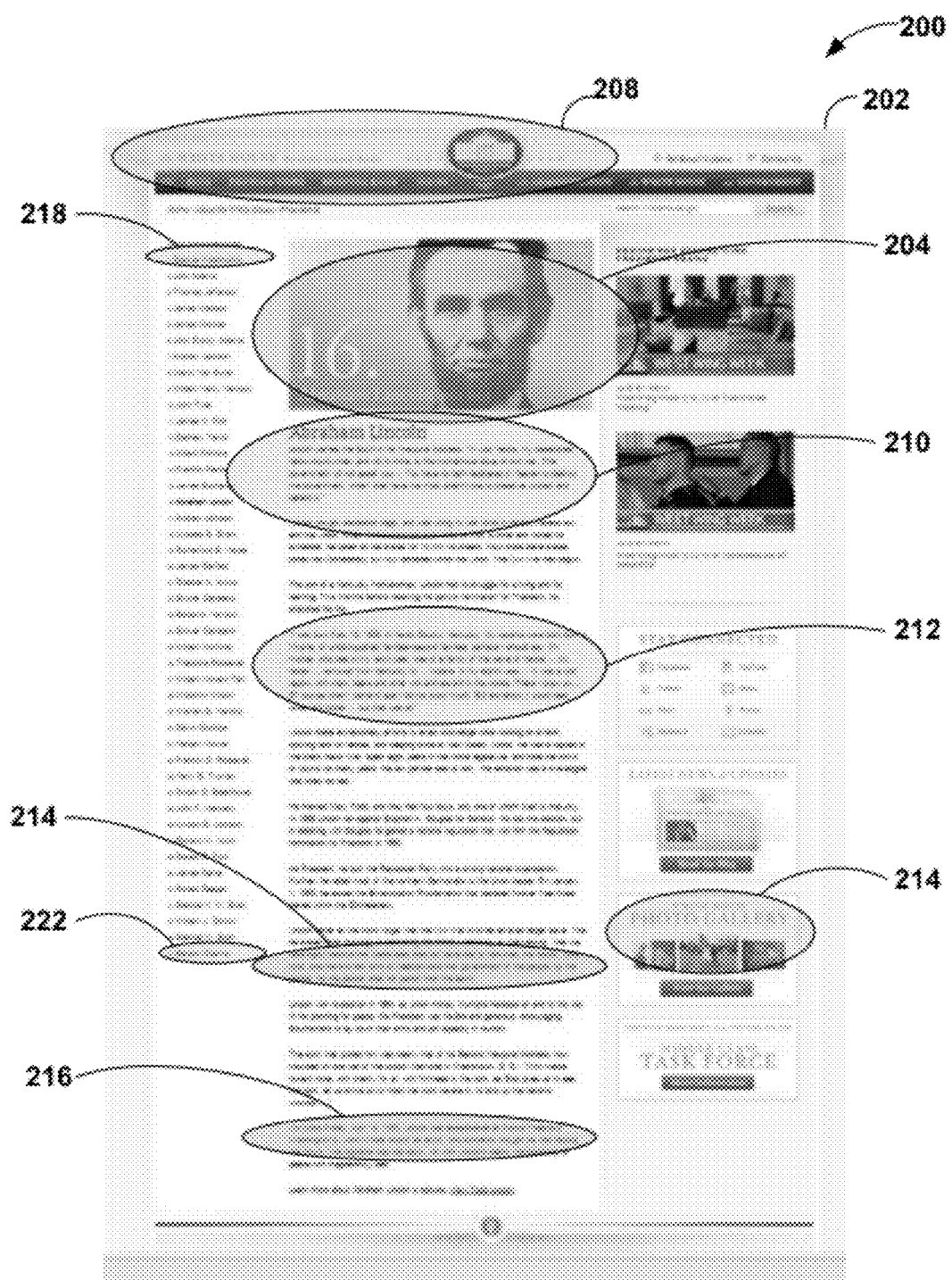
FIG. 7 is an example of a heat map representing interest information, which may be generated by an interest mapping system.

FIG. 7 illustrates another example interest map 200 for a web page or other information resource which may be generated by interest mapping system 130. In this example, interest map 200 is a "heat map" which highlights areas of interest on a web page 202. Heat map 200 may thus provide visual feedback concerning viewing and the relative amount of viewing for each area of the page. In this example, heat map 200 is a representation of the web page overlaid with information indicative of the areas at which persons in a group of users paused for a predetermined period of time when viewing the webpage or email. The heat map visually conveys information concerning which areas of the web page at which those within group of users paused or didn't pause. For example, areas 204, 214 and 216, shown in crosshatch, may be the areas at which users paused most frequently. In this example, these correspond to the areas mentioned above with respect to the histogram shown in FIG. 6. As another example, areas 208, 210 and 212, shown with right-leaning hatching, may be of secondary interest, and areas 214, 218 and 222, shown with vertical hatching, may be of tertiary interest. Many other levels of interest may also be mapped, and it shall be understood that FIG. 7 is but one example of a heat map that may be generated. The heat map may also convey information concerning how many (e.g., the frequency) of the users paused or didn't pause at a particular area on the page. A heat map such as heat map 200 may thus also convey probability information concerning what page content users are most likely to pause at when they view the page.

A heat map may also includes a representation of the web page with the frequency information overlaid in different colors representing the frequency at which a plurality of users paused different areas of the web page or other information resource. For example, areas having a relatively higher range of frequency values may be indicated in red, areas having a medium range of frequency values may be indicated in orange and/or yellow, areas having relatively low frequency value may be indicated in green or blue, and areas not paused at may be indicated as gray or with no color, etc. The heat map may help to identify those areas on the page with the highest frequency values, and thus where users paused the most often. In this way, the heat map may assist in identifying those areas on the web page that are of most interest to users.

In other examples, an interest map may take the form of an interest graph, table, bar graph, or other numerical or graphical representation for displaying areas of a web page at which users paused for at least a predetermined period of time. An interest graph may also contain information concerning the view order.

The information presented in an interest graph may help analysts to determine whether users are viewing or scanning the page efficiently or in the manner intended by the web page designers. This may further help analysts determine whether users are getting the intended content from the web page, or whether a redesign may be necessary for the desired goals of the web page or other information resource to be achieved.

Figure 8:
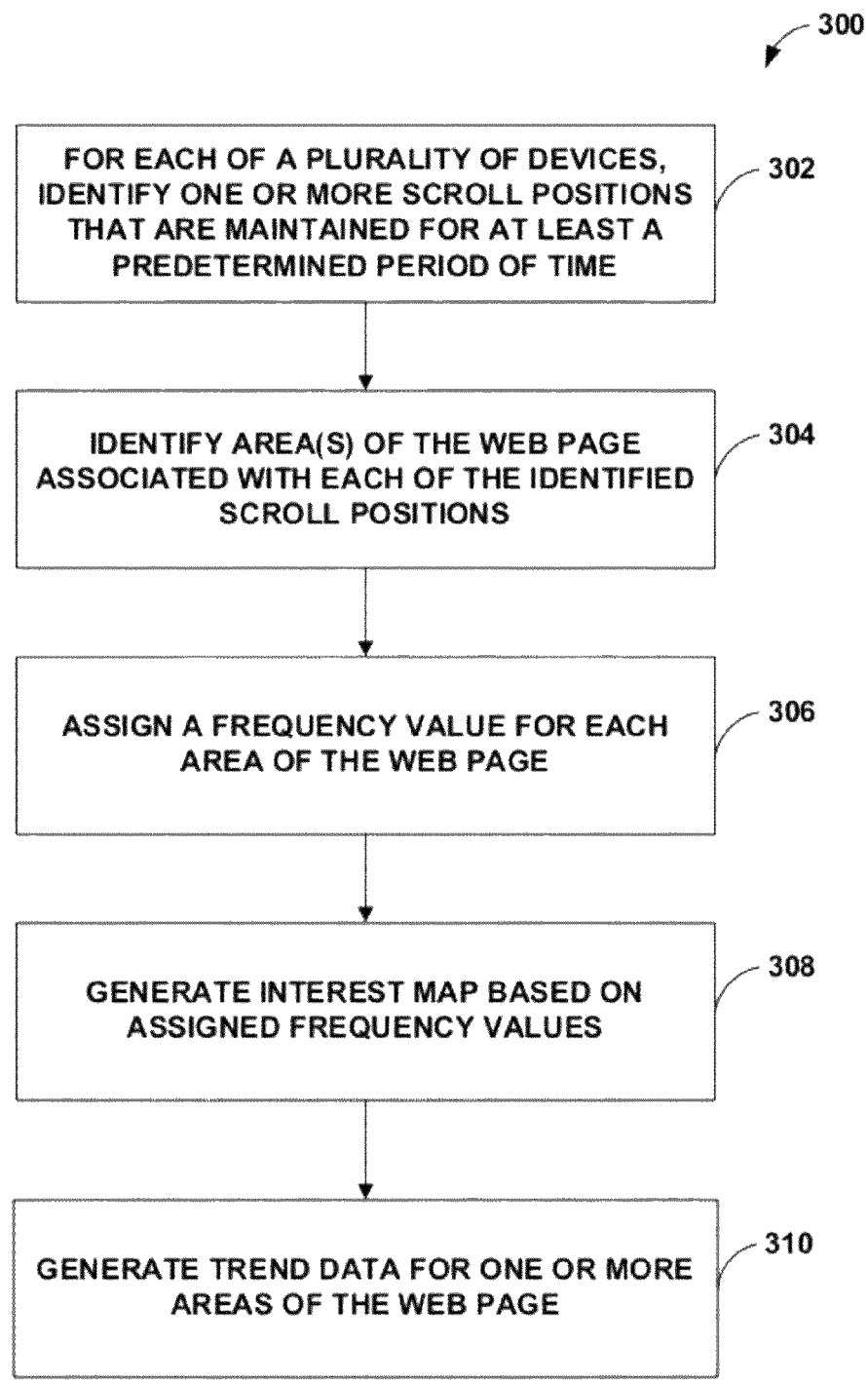
FIG. 8 is a flow chart illustrating an example process by which an interest mapping system may identify areas of interest on a web page or other information resource.

FIG. 8 is a flow chart illustrating an example process (300) by which an interest mapping system may identify areas of interest on a web page or other information resource. For example, interest mapping module 144 of interest mapping system 130 (see FIG. 5) may include software that, when executed by one or more processors 140, performs the process (300). Alternatively, a user computing device, such as one or more of user computing devices 100, may include software that performs a portion(s) of the process 320.

For each of a plurality of computing devices (such as mobile computing devices 100A-100N), the processor may identify one or more scroll positions that are maintained for at least a predetermined period of time (302). The processor may identify one or more areas of the web page (or other information resource) that are associated with each of the identified scroll positions (304). These areas on the web page or other information resource correspond to those areas at which one or more users paused for at least the predetermined period of time.

A frequency value may be assigned to each area of the web page (306). For example, if 200 users paused at a particular area on the page, that area may be assigned a frequency value of 200. Similarly, if 10,000 users paused at a particular area on the page, that area may be assigned a frequency value of 10,000. The frequency values may be relative, absolute or they may be normalized. The processor may generate an interest map based on the assigned frequency values (308). For example, the interest map may include a histogram, a heat map, a bar graph, or other graphical representation.

Trend data may be generated for one or more areas of the web page (310). For example, the frequency assigned to one or more areas of the web page over time may be compared to determine what users are viewing today as opposed to what was viewed in the past. For certain web pages or areas of a web page, relative trends of different areas of the web page may be of interest. For others, an absolute change in the frequency or other assigned score may be more relevant.

Figure 9:
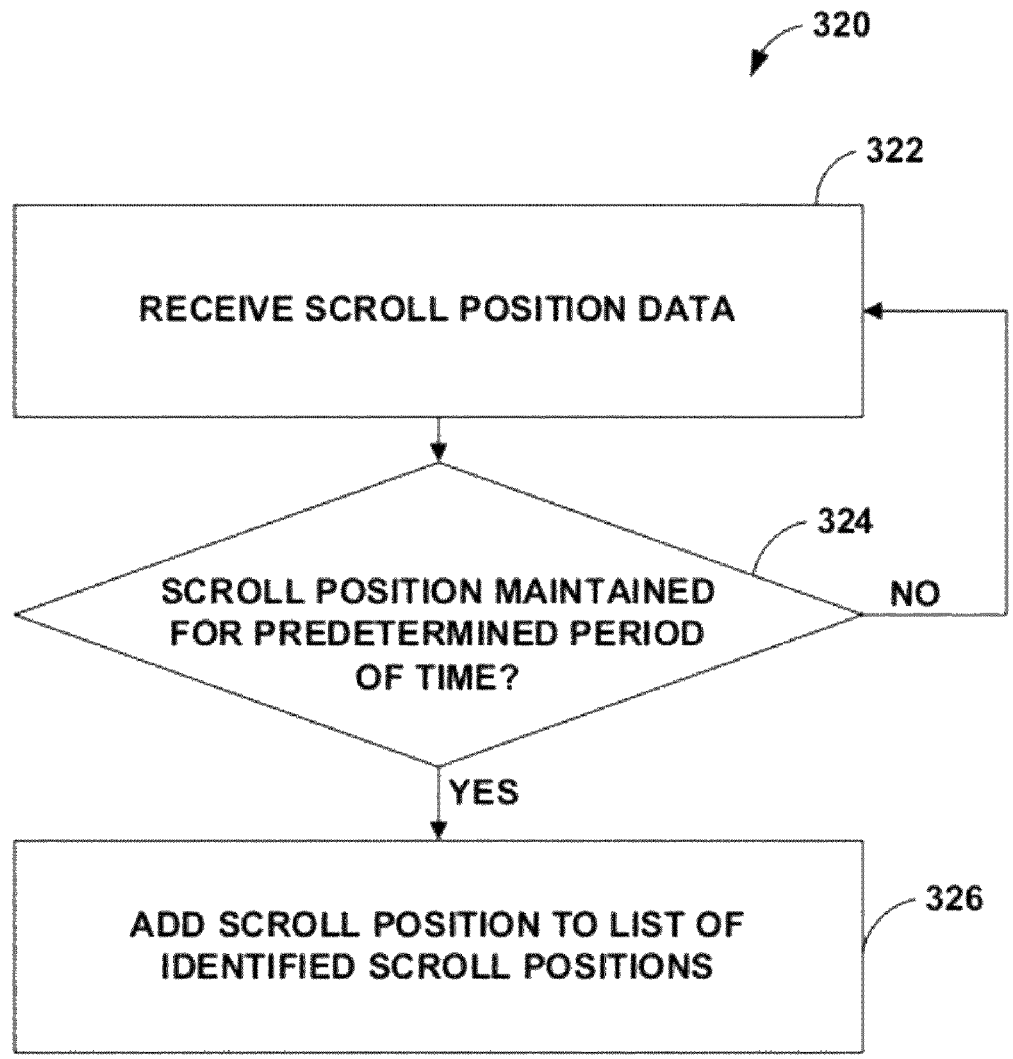
FIG. 9 is a flow chart illustrating an example process by which an interest mapping system may identify scroll positions that are maintained for at least a predetermined period of time.

FIG. 9 is a flowchart illustrating an example process (320) by which a processor may identify scroll positions that are maintained for at least a predetermined period of time (see, e.g., reference numeral 302 of FIG. 7). For example, interest mapping module 144 of interest mapping system 130 (see FIG. 5) may include software that, when executed by one or more processors 140, performs the process 320. Alternatively, a user computing device, such as one or more of user computing devices 100, may include software that performs some or all of the process 320.

The processor receives scroll position data (322) from each of a plurality of computing devices. For example, one or more processors 140 of an interest mapping system 130 may receive scroll position data 122 from one or more computing devices 100A-100N as shown in FIG. 5. The processor, such as processors 140 under control of interest mapping module 144, may determine whether each scroll position is maintained for at least a predetermined period of time (324). If the scroll position is not maintained for at least the predetermined period of time, the processor receives data concerning the next scroll position. If, on the other hand, the scroll position is maintained for at least the predetermined period of time (324), the processor may add the identified scroll position to a list of identified scroll positions (326).

In those examples where a predetermined period of time is used, the predetermined period of time may be a length of time indicative of whether the user is "interested" in what is currently being displayed on their computing device. As mentioned above, once a user has scrolled to a position on a web page or other information resource at which content of interest is displayed, the user may maintain that scroll position for a relatively longer period of time than those scroll positions displaying content of which they are not interested. Content which is of no particular interest to a user may be scrolled-through fairly quickly. For example, it may be determined that when a user pauses at a particular scroll position for at least a predetermined period of time, t, that the user is at least minimally interested in the information content associated with that scroll position on their computing device.

The predetermined period of time may be determined in a variety of ways. For example, t may be empirically determined through observation or experimentation. Alternatively or in addition, t may be subjectively determined based on a desired minimum period of time that a particular website or area on the website other information resource should be viewed. The period of time may be in the range of 1-3 seconds, for example. However, this is but one example, and the disclosure is not limited in this respect.

In addition, more than one predetermined period of time may be used. For example, a first period of time, $t_1$, may be used to determine a first degree of interest in an area of a web page. A second and/or other additional periods of time, $t_2$, $t_3$ ... $t_n$, may be used to designate other degrees of interest in an area of a web page. For example, a shorter period of time may indicate a relatively lesser degree of interest in a particular area. Longer periods of time may be indicative of relatively greater interest in an area. Longer periods of time may also be indicative of increased amounts of time required to absorb the information contained in the area. In addition, different predetermined periods of time may be used for different areas of the web page or other information resource. For example, a first period of time, $t_1$, may be assigned to at least one area of a web page. A second and/or other additional periods of time, $t_2$, $t_3$ ... $t_n$, may be assigned to one or more other areas of the same web page. Therefore, it shall be understood that one or more predetermined periods of time may be used, and that these various periods of time may be indicative of a variety of interest types.

The predetermined period of time may be adjusted to take into account natural pauses, such as the top of page, slow-loading images or sections of a page, etc. In addition, the data may be examined to remove outliers, such as very small or very large numbers.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
receiving, at a processor, scroll position data from each of a plurality of computing devices;
identifying, using the processor and based on the scroll position data, one or more scroll positions maintained for at least a predetermined period of time on each of the plurality of computing devices;
identifying, using the processor, areas of a web page displayed on the plurality of computing devices for at least the predetermined period of time based on the one or more identified scroll positions;
determining a number of times each of the identified areas of the web page was displayed on the plurality of computing devices for at least the predetermined period of time; and
generating an interest map indicative of the determined number of times each of the identified areas of the web page was displayed on the plurality of computing devices for at least the predetermined period of time.

2. The method of claim 1 wherein the interest map comprises one or more of a histogram, a heat map, and an interest graph.

3. The method of claim 1 wherein the plurality of computing devices comprise one or more of a wireless communication device, a video telephone, a digital multimedia player, a personal digital assistant (PDA), a video game console, a tablet PC, a laptop computer, or a mobile phone.

4. The method of claim 1 further comprising receiving, at the processor, device configuration data associated with each of the plurality of computing devices.

5. The method of claim 4 wherein the device configuration data is indicative of a display height and a display width for the associated computing device.

6. The method of claim 1 further comprising assigning at least one of a relative, an absolute, and a normalized frequency at which the identified area was displayed on the plurality of computing devices for each of the identified areas of the web page.

7. The method of claim 1 wherein the scroll position data includes vertical scroll bar position data and horizontal scroll bar position data.

8. The method of claim 1 further comprising storing, in a database, a map of the web page that identifies a plurality of areas within the web page.

9. The method of claim 8 wherein the map of the web page includes a plurality of areas of equal size.

10. The method of claim 8 wherein each image in the web page includes one or more areas.

11. The method of claim 8 wherein a defined amount of text includes one or more areas.

12. The method of claim 1 further comprising computing trend data over time for each area of the web page.

13. The method of claim 12 further comprising computing an absolute change in the trend data from one time period to another time period for at least one area of the web page.

14. The method of claim 12 further comprising computing a relative change in the trend data from one time period to another time period for at least one area of the web page.

15. The method of claim 1 wherein the web page is divided into a plurality of areas, the method further comprising assigning a first predetermined period of time to at least one area from the plurality of areas of the web page and a second predetermined period of time to at least one other area of the web page.

16. The method of claim 1 further comprising assigning a first predetermined period of time indicative of a relatively lesser degree of interest and a second predetermined period of time indicative of a relatively greater degree of interest.

17. A tangible computer-readable storage medium encoded with instructions that cause one or more processors of a computing device to perform operations comprising:
   receive scroll position data from each of a plurality of computing devices;
   identify, based on the scroll position data, one or more scroll positions maintained for at least a predetermined period of time on each of plurality of the computing devices;
   identify areas of a web page displayed on the plurality of computing devices for at least the predetermined period of time based on the one or more identified scroll positions;
   determine a number of times each of the identified areas of the web page was displayed on the plurality of computing devices for at least the predetermined period of time; and
   generating an interest map indicative of the determined number of times each of the identified areas of the web page was displayed on the plurality of computing devices for at least the predetermined period of time.

18. A system comprising:
   at least one processor that receives scroll position data from each of a plurality of computing devices; and
   a database that stores the scroll position data and an interest mapping application,
   wherein the processor further identifies, based on the scroll position data, one or more scroll positions maintained for at least a predetermined period of time on each of the plurality of computing devices, identifies areas of a web page displayed on the plurality of computing devices for at least the predetermined period of time based on the one or more identified scroll positions, determines a number of times each of the identified areas of the web page was displayed on the plurality of computing devices for at least the predetermined period of time, and generates an interest map indicative of the determined number of times each of the identified areas of the web page was displayed on the plurality of computing devices for at least the predetermined period of time.

* * * * *